Jan. 29, 1924.
S. W. FINCH
OIL GAUGE
Filed March 17, 1923
1,481,835
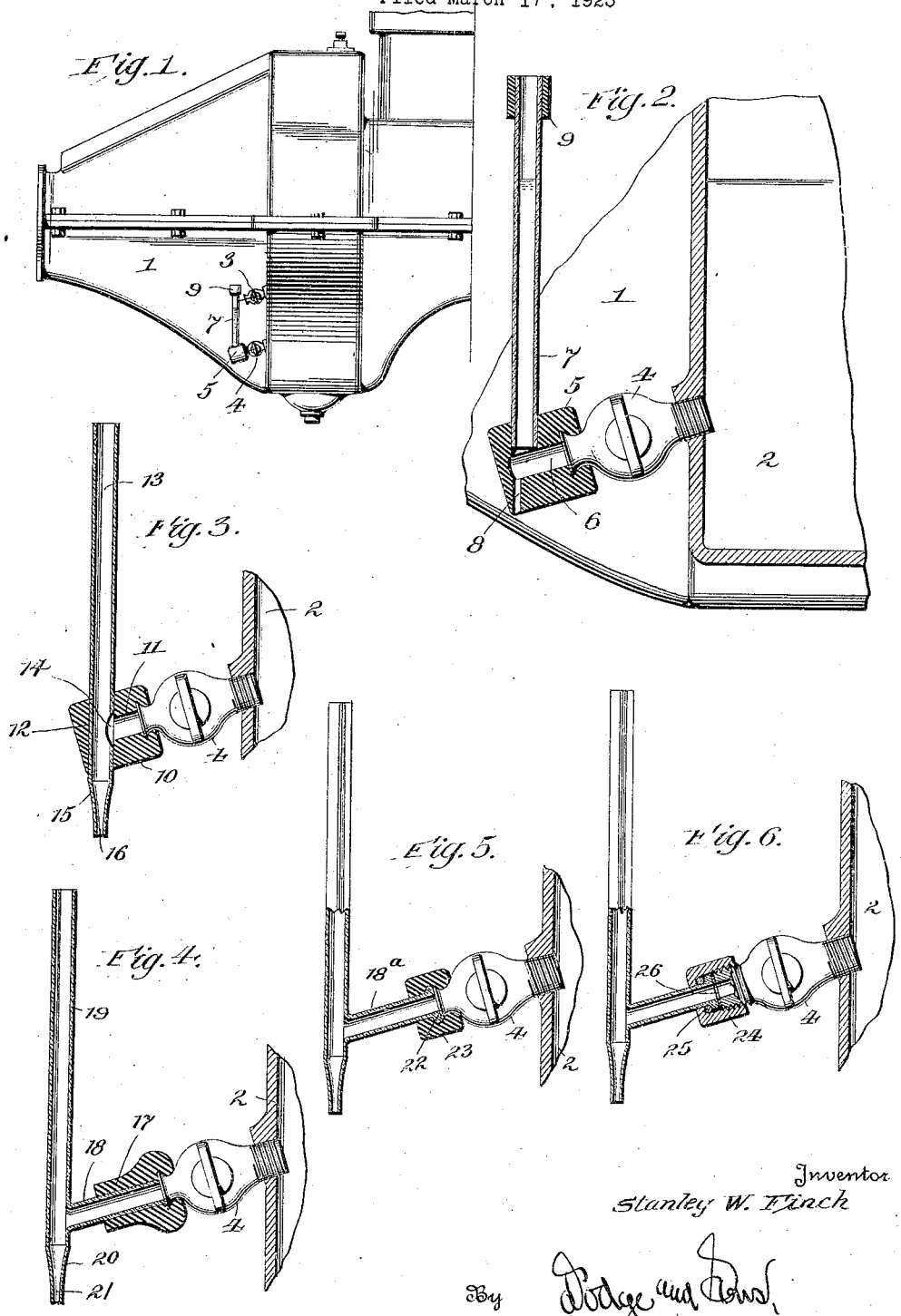
Inventor
Stanley W. Finch Patented Jan. 29, 1924.

1,481,835

UNITED STATES PATENT OFFICE.

STANLEY W. FINCH, OF WASHINGTON, DISTRICT OF COLUMBIA.

OIL GAUGE.

Application filed March 17, 1923. Serial No. 625,887.

*To all whom it may concern:*

Be it known that I, STANLEY W. FINCH, a citizen of the United States, residing at Washington, District of Columbia, have invented certain new and useful Improvements in Oil Gauges, of which the following is a specification.

This invention pertains to gauges, and more specifically, to a gauge adapted to be used in connection with internal combustion engines wherein a sump is employed. In certain automobiles, such as the Ford, pet-cocks are employed to determine the level of the oil in the sump, which, as is well understood by those skilled in the art, must be kept within certain limits in order that the machine may be effectively operated.

The present invention has for its object the production of a simple and effective sight-gauge which may be attached to the lower pet-cock of the two pet-cocks found upon the Ford machine. As will be understood by users of the Ford car, it is necessary to manipulate the pet-cocks to determine the oil level, the upper one being opened when the oil is being poured in to determine by the passage of oil therein when a sufficient height or depth of oil has been reached. The lower pet-cock is opened at times to determine that the oil has not dropped below a given or predetermined level.

The manipulation of these pet-cocks is awkward and unsatisfactory in use, because to determine the height of the oil, both pet-cocks must be opened and even then only a rough estimate can be made of the depth of the oil in the sump. The present invention is designed to produce a simple and effective gauge which may be attached to the lower pet-cock without the removal of said cock or change in its structure. It, moreover, does away with the necessity of opening the upper cock to determine the exact height of the oil at the time sump is being filled.

Again, the structure is such that in attaching the gauge, or in removing the same, no oil escapes from the cock, which at such times, is closed. Again the gauge may be easily attached or removed and without soiling one's hands.

Various forms of the invention are illustrated in the annexed drawings, wherein,—

Fig. 1 is a side elevation of a portion of a Ford engine showing the gauge applied to the lower cock;

Fig. 2 an enlarged detail sectional view thereof; and

Figs. 3 to 6 inclusive, sectional views showing various modifications or embodiments of the invention.

Referring first to Figs. 1 and 2, 1 denotes the engine casing and 2 the sump. The upper pet-cock is denoted by 3 and the lower pet-cock is denoted by 4. Secured upon the outer end of said lower pet-cock is a block or body 5, formed of suitable material, such as oil resisting rubber, cork or the like, having a chamber 6 formed therein which opens at the inner end or that end which lies next adjacent the mouth of the cock. The block or body 5 may be forced over the enlarged end of the pet-cock 4 and held in position by the gripping action of the body. Extending into the chamber 6 is an opening in which there is inserted a transparent tube 7, preferably formed of glass. The block or body 5 is also provided at its lower side with a restricted opening or passage 8, which is left open at all times. The upper end of the gauge tube 7 is likewise open, and if desired a rubber ring or sleeve 9 may be placed thereon so as to prevent any rattle should the tube contact the engine housing 1 or the upper pet-cock 3 while the machine is running.

In operation, assuming it be desired to fill the sump and to determine the height of oil poured in, or to determine the height of the oil at any time, it is only necessary to open the pet-cock 4. If the oil is above the inner end of the cock it will run out therefrom into the chamber 6 and up into the tube 7. At the same time a small amount of oil will drop slowly from the restricted opening 8, but inasmuch as the calibre of the tube is relatively small and the chamber 6 is likewise small in volume, the amount of oil lost is negligible.

Should the operator fail to close the cock 4, the oil will continue to drop from the opening 8 and thus put him on notice that the cock is still open.

In Fig. 3, instead of employing a restricted opening formed in the block or body 5, as in the construction just described, I employ a block or body 10, adapted to be snapped on to the enlarged end of the pet-cock 4, said body having a chamber 11, and likewise formed with an opening 12 which extends through the body from side to side and is in communication with the chamber 11. Into the opening 12 there is inserted a glass tube 13, having a lateral port or opening 14, which when the tube is positioned, communicates with the chamber 11. The lower end of the tube is drawn down, as at 15, forming a restricted outlet or opening 16, which is equivalent to the restricted opening 8.

In Fig. 4 the block or coupling element is denoted by 17, and is secured to the pet-cock in the manner above set forth. In this instance the block is provided with a longitudinal bore or opening in line with the outlet of the pet-cock and into the outer end of the bore is inserted a laterally extending branch or arm 18 of a sight-tube 19, the lower end of which is tapered, as at 20, forming a restricted opening or outlet 21.

In Fig. 5 I have disclosed a construction which is substantialy the same as that in Fig. 4, except for the fact that the inner end of the laterally extending branch 18ª of the sight-gauge tube is provided with an enlargement 22 which functions with the coupling element 23 which is snapped over the outer end or mouth of the pet-cock.

In Fig. 6 the same form of gauge tube as shown in Fig. 5 is employed. The tube is secured to the pet-cock, the outer end of which latter is externally threaded, by a coupling sleeve 24. A suitable packing, as 25, and a gasket or washer 26, will be employed to effect a tight union between the parts and to prevent breakage of the gauge tube.

In referring to the passage 8, Figure 2, and to the passages 16 and 21, Figs. 3 and 4, respectively, as being restricted openings, it is to be understood that it means an opening or passage which is smaller than the chamber or bore, 6, Fig. 2, or smaller than the chamber 11, Fig. 3 and smaller than the chambers in the lateral branches, shown in Figs. 4, 5 and 6. In other words, the restricted opening is smaller than the chamber just mentioned, so that the oil will be caused to rise in the gauge 2, rather than to flow uninterruptedly out of the drainage opening when the pet-cock 4, is opened.

The members 5 and 10, and the extensions 18 and 18ª may be termed entrance chambers which are adapted to be connected to the pet-cock or its equivalent, and carry the oil to the gauge tube.

What is claimed is,—

1. In combination with the oil reservoir or sump of an internal combustion engine; a pet-cock in communication with the lower portion thereof; and a gauge communicating with the cock and adapted, when the cock is opened, to indicate the level of the oil in the sump, said gauge being provided with a restricted normally open drain passage.

2. In combination with the oil reservoir or sump of an internal combustion engine; a pet-cock in communication with the lower portion thereof; a chambered member secured to the pet-cock, said member being provided with a restricted drainage opening extending into the chamber said drainage opening being open at all times; and a gauge tube extending upwardly from said member and opening into the chamber therein.

3. As a new article of manufacture, an oil gauge for internal combustion engines, comprising a resilient body adapted to be secured to a pet-cock, said body being provided with a chamber and a normally open restricted drainage opening extending from said chamber; and a gauge tube mounted in the opening formed in the body.

4. An oil gauge comprising a transparent tube operative in an upstanding position and means for attaching the tube to the outer port of a pet-cock said means being provided with a conduit adapted to connect the interior of the tube with the interior of the pet-cock, and a smaller, permanently-open conduit for the exit of oil from the gauge.

5. As a new article of manufacture a liquid measuring gauge comprising a transparent sight tube; a tubular entrance chamber in communication, at one end, with the interior of said sight tube; a normally permanently-open drain orifice in the wall of the gauge adjacent the lower end of the sight tube adapted to drain out the contents thereof, the said orifice being of materially smaller capacity than the intake end of the entrance chamber; and means for connecting the gauge with a pet-cock through which liquid may enter the gauge from a chamber containing the liquid to be gaged.

6. As a new article of manufacture a liquid measuring gauge comprising a transparent sight tube; a member having a chamber in communication with the interior of the sight tube; a normally permanently-open restricted drain orifice in the wall of the gauge adjacent the lower end of the sight tube for the exit of the contents thereof; and means for connecting the gauge to a chamber containing the liquid to be gaged.

7. An oil gauge comprising a transparent tube operative in an up-standing position; a resilient member to which said tube is attached, said member having a recess the walls of which are adapted to stretch over the outer end of a pet-cock, a conduit adapted to connect the interior of the tube with the interior of the pet-cock and a smaller, permanently-open conduit for the exit of oil from the gauge.

In testimony whereof I have signed my name to this specification.

STANLEY W. FINCH.